US006834775B1

(12) United States Patent
Collins

(10) Patent No.: US 6,834,775 B1
(45) Date of Patent: Dec. 28, 2004

(54) PROGRAMMABLE MEDICINE DISPENSER

(76) Inventor: Sheila Collins, 1634 Fiske Ave., Pasadena, CA (US) 91104

( * ) Notice: Subject to any disclaimer, the term of this patent is extended or adjusted under 35 U.S.C. 154(b) by 87 days.

(21) Appl. No.: 10/423,521

(22) Filed: Apr. 25, 2003

(51) Int. Cl.[7] .............................................. B65G 59/00
(52) U.S. Cl. ....................................... 221/124; 221/194
(58) Field of Search .............................. 221/2, 7, 9, 13, 221/15, 92, 123, 133, 124, 130, 191, 194, 258

(56) References Cited

U.S. PATENT DOCUMENTS

2003/0209559 A1 * 11/2003 Chirnomas .................. 221/123

* cited by examiner

*Primary Examiner*—Kenneth Noland
(74) *Attorney, Agent, or Firm*—Goldstein Law Offices, P.C.

(57) ABSTRACT

A medicine dispensing system for dispensing medicine carriers, wherein each medicine carrier contains medicine which is to be dispensed at an appropriate time of the day and week for that carrier, having a housing. The housing has a patient accessible medicine retrieval compartment. The medicine carriers are placed within tubes located within a housing by a pharmacist, who may access the tubes through a pharmacist access panel. Actuator motors allows the carriers to be moved to the medicine retrieval compartment at the appropriate time of the day and week, as specified by the programming of the pharmacist. Once in the retrieval compartment, the patient can remove carrier and ingest the medicine contained therein. If the medicine carrier is not removed from the retrieval compartment by the patient within a predetermined time, the medicine carrier is moved to a storage compartment which is not accessible by the patient.

8 Claims, 7 Drawing Sheets

PROGRAMMABLE MEDICINE DISPENSER

BACKGROUND OF THE INVENTION

The invention relates to a programmable medicine dispenser. More particularly, the invention relates to a medicine dispenser which dispenses medicine to the user at the appropriate times of the day, throughout the week, as programmed and filled by a pharmacist.

When a doctor prescribes a medication, the prescription usually dictates the dosage and how often the medication is to be ingested. In most cases, the prescribed instructions are easy to follow by the patient.

When numerous medications are prescribed simultaneously, however, it is difficult for any patient to remember when a certain medicine is to be taken, whether that medication has already been taken, and to avoid confusing different medications. Further, people suffering from various mental infirmities often have difficulty taking the correct medications. In addition, since people are living longer lives, an increasing amount of medications are prescribed to help maintain the health of these older people.

In addition a prevalent problem with certain medications is abuse. When a medication makes a person feel better but loses effectiveness before the next dose is to be taken, the patient will often take another dose of the medication "early", and/or might "double up" the dose. Failing to follow the prescription can be extremely harmful to the patient's health, and can lead to addiction.

Further, when people later realize that they did not take their medicine at the appropriate time, they often take the medicine much later. Such practice is discouraged by physicians and pharmacists for many medications. However, it is very difficult for a physician and pharmacist to maintain patient compliance with such rules.

Certain devices have been provided which attempt to maintain compliance with prescriptions among patients. These devices include clocks and pill boxes which warn the user when to take medicine. Other devices allow precision dispensing of medicines, yet do not accommodate numerous medicine 'takings' per day, do not prevent 'double doses' and are not tamperproof. While these units may be suitable for the particular purpose employed, or for general use, they would not be as suitable for the purposes of the present invention as disclosed hereafter.

SUMMARY OF THE INVENTION

It is an object of the invention to provide a medicine dispensing device which dispenses the proper medications to a patient at the intended times. Accordingly, the device keeps medicines dosages within a carrier. Each carrier is associated with one particular time of day at which medicines are to be taken. All medicines to be taken at that time of day, and only medicines to be taken at that time of day are pre-loaded into the carrier by a physician or pharmacist. The carriers are dispensed to the user at the appropriate time.

It is another object of the invention to provide a medicine dispensing system which is tamper-proof, so as to prevent a patient from circumventing the system to take medicine at an inappropriate time. Accordingly, the system is contained within a tough housing, which is locked and only openable by the physician or pharmacist.

It is a further object of the invention to provide a medicine dispensing system which notifies a patient when to take the dose. Accordingly, an alarm sounds to prompt the patient to take the medication.

It is a still further object of the invention to provide a medicine dispensing system which helps maintain compliance by preventing a person from taking medication later than the time it is dispensed. Accordingly, the medicine carrier is dispensed into a compartment having a retrieval door, and the system senses when the retrieval door is opened. Thus, the alarm will continue to sound until the patient opens the retrieval door to retrieve the carrier. If the carrier is not removed within a predetermined time period, the medicine carrier will be automatically removed from the compartment and placed into a storage compartment where it cannot be retrieved by the patient.

The invention is a medicine dispensing system for dispensing medicine carriers, wherein each medicine carrier contains medicine which is to be dispensed at an appropriate time of the day and week for that carrier, having a housing. The housing has a patient accessible medicine retrieval compartment. The medicine carriers are placed within tubes located within a housing by a pharmacist, who may access the tubes through a pharmacist access panel. Actuator motors allows the carriers to be moved to the medicine retrieval compartment at the appropriate time of the day and week, as specified by the programming of the pharmacist. Once in the retrieval compartment, the patient can remove carrier and ingest the medicine contained therein. If the medicine carrier is not removed from the retrieval compartment by the patient within a predetermined time, the medicine carrier is moved to a storage compartment which is not accessible by the patient.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
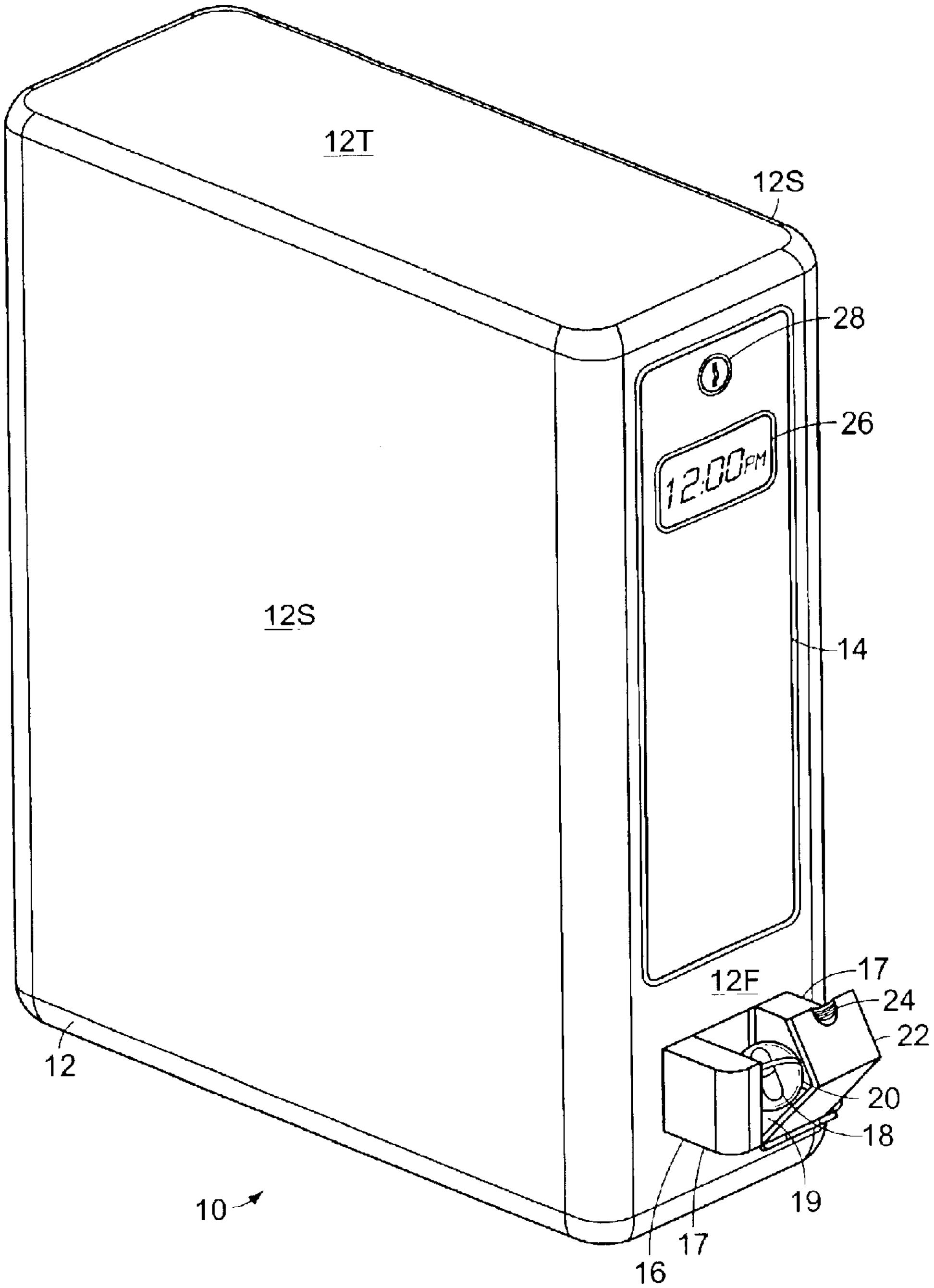
FIG. 1 is a diagrammatic perspective view of the medicine dispensing system according to the present invention.

FIG. 1 illustrates a medicine dispensing system 10, contained within a housing 12. The housing has a top 12T, a bottom 12B, a front 12F, and sides 12S. The front 12F includes a pharmacist access panel 14, and a medicine retrieval compartment 16. Note that the present invention allows the medicine dispensing system 10 to be loaded by a physician, pharmacist, or other authorized medical personnel. For simplicity, "pharmacist" is used interchangeably with the same.

As illustrated in FIG. 1, a medicine 18, located within a medicine carrier 20 has been dispensed to the medicine retrieval compartment 16. The medicine retrieval compartment 16 is defined by two side members 17 and a compartment bottom 19. A retrieval door 22 is hingeably attached to the compartment bottom 19 and extends transversely between the two side members 17 such that the retrieval door 22 opens forward. The retrieval door 22, when closed, forms a front and top of the medicine retrieval compartment 16. As shown, the retrieval door 22 has been opened by the user by pressing down upon a thumb indent 24 and hingeably opening the retrieval door 22, thereby giving the patient access to the medicine carrier, and allowing the patient to remove the medicine carrier 20 to ingest the medicine 18 therein.

The pharmacist access panel 14 is illustrated in the closed and locked position. The pharmacist access panel 14 is normally closed and locked—except when the dispenser 10 is being loaded and programmed by the pharmacist. The pharmacist access panel 14 contains a clock/display 26 which can be used to display the current time of day, and can be programmed to flash for notifying the patient to remove medicine from the medicine retrieval compartment 16, to provide a countdown until the next dosage, display status information, etc. A lock 28 is provided to keep the door in the locked position. The lock 28 can only be opened by the pharmacist. A key lock is illustrated. However, other locks, including electronic locks, keypad operable locks, magnetic "pass key" locks, and the like can be used as well.

Figure 2:
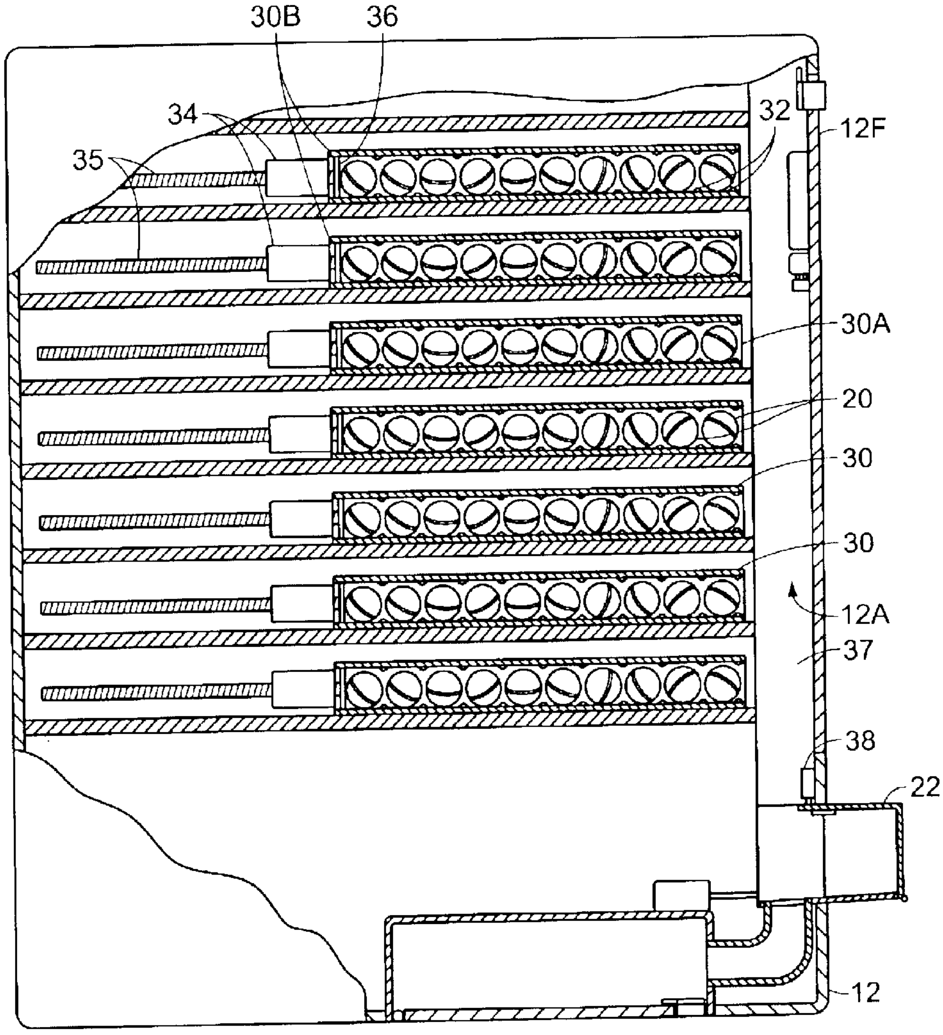
FIG. 2 is a side elevational view, with parts broken away, illustrating the horizontally extending tubes, each containing numerous medicine carriers, and the dispensing mechanisms.

FIG. 2 illustrates internal details of the dispenser system. The housing 12 defines an interior volume 12A which houses the medicine carriers 20, and mechanisms for dispensing the carriers 20. In particular, a plurality of tubes 30 extend horizontally within the housing and are stacked vertically. Preferably, seven tubes are provided—one of each day of the week. Each of the tubes 30 has an open end 30A which is oriented toward the front, but spaced from the front 12F at a sufficient distance so as to allow the medicine carriers to fall immediately in front of the tubes. Each tube 30 has a back end 30B, fully opposite from the open end 30A. Each tube 30 has a plurality of carrier positions where a medicine carrier 20 may be located. Preferably at least ten carrier positions are provided—as each carrier position allows for a different time of day at which medicine may be dispensed. Each carrier position is generally defined by a pair of dividing bumps 32. The dividing bumps 32 are evenly spaced longitudinally along the tube 30. The medicine carriers 20 rest between the bumps 32, which prevent the carriers 20 from rolling longitudinally within the tube, except when pushed with sufficient force.

Figure 3:
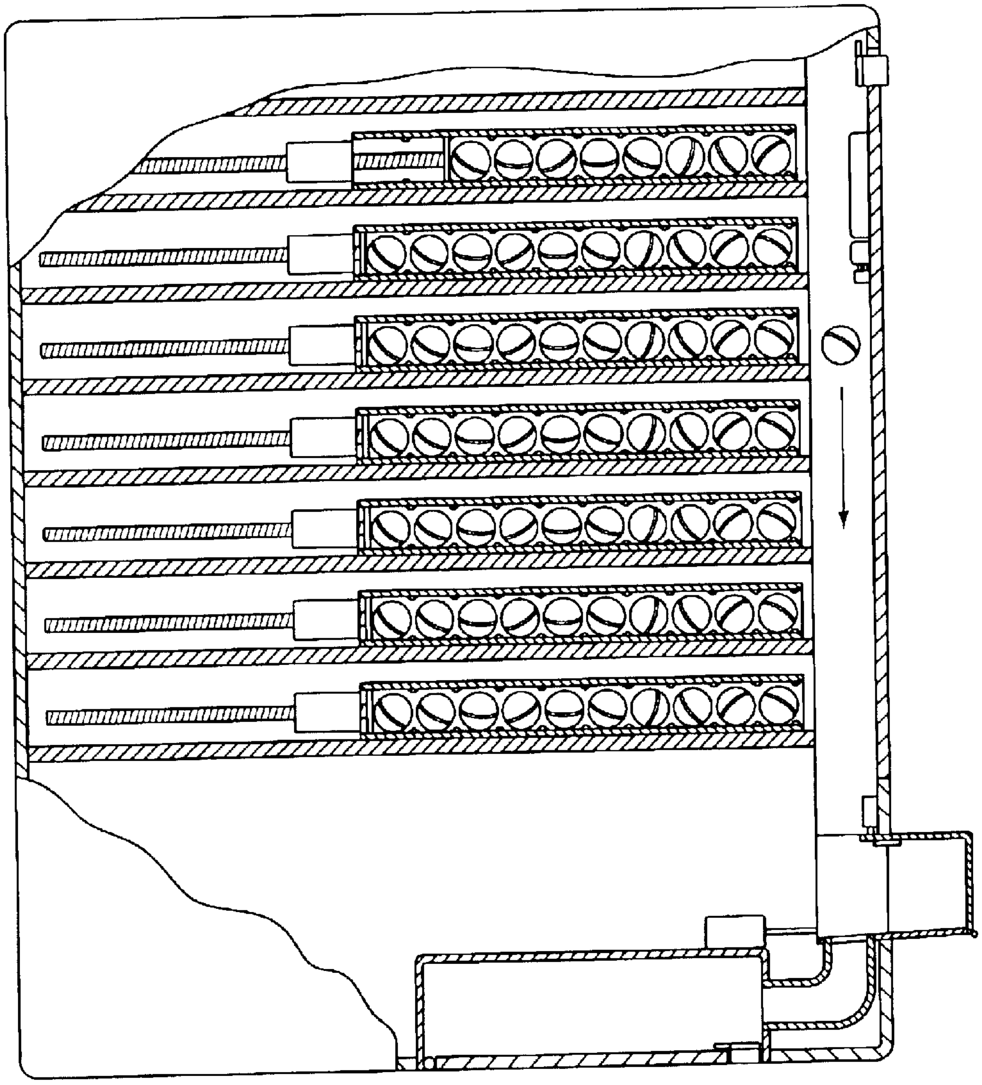
FIG. 3 is a side elevational view, similar to FIG. 2, wherein one of the carriers is being dispensed.

In this regard, a plurality of actuating motors 34 are provided, wherein one actuating motor 34 is associated with each of the tubes 30. The actuating motor 34 has a shaft 35 and a plunger 36 located at one end of the shaft 35. The actuating motor 34 is capable of moving the plunger 36 from an initial position near the back end 30B of the tube 30 to a final position near the open end 30A of the tube 30. The actuating motors 34 are incrementally operated, so that they push all of the medicine carriers over the dividing bumps 32, to urge them forward so that the medicine carrier 20 closest to the open end falls out of the open end, as shown in FIG. 3.

Figure 4:
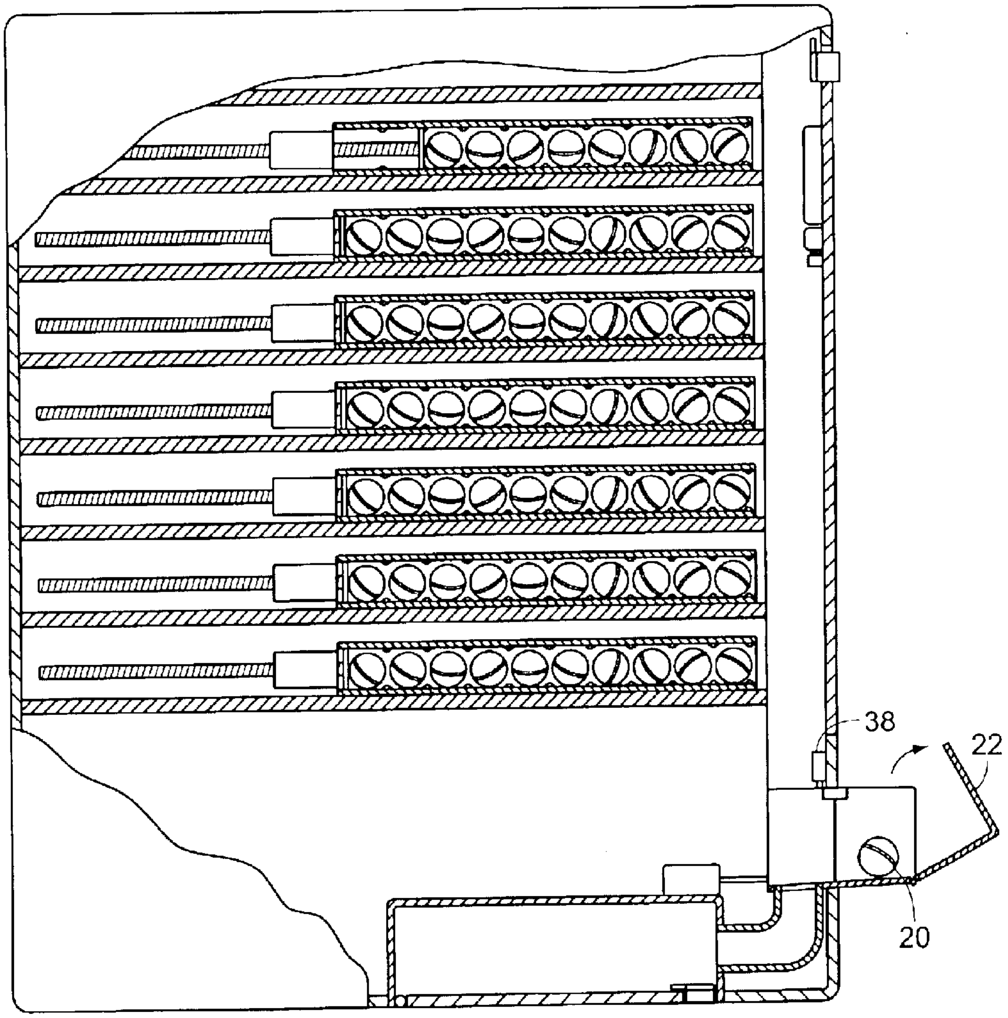
FIG. 4 is a side elevational view, similar to FIGS. 2-3, wherein the retrieval door is being opened by the patient to retrieve a medicine carrier.

A front chute 37 is located between the open end 30A of the tubes 30 and the front 12F of the housing 12. The front chute 38 allows the medicine carriers 20 to fall into the retrieval compartment 16. A door sensor 38 determines when the retrieval door 22 has been opened. Accordingly, when the door is opened by the patient in FIG. 4, the medicine carrier 20 may be removed, and the door sensor 38 recognizes that the medicine carrier 20 has been removed.

Figure 5:
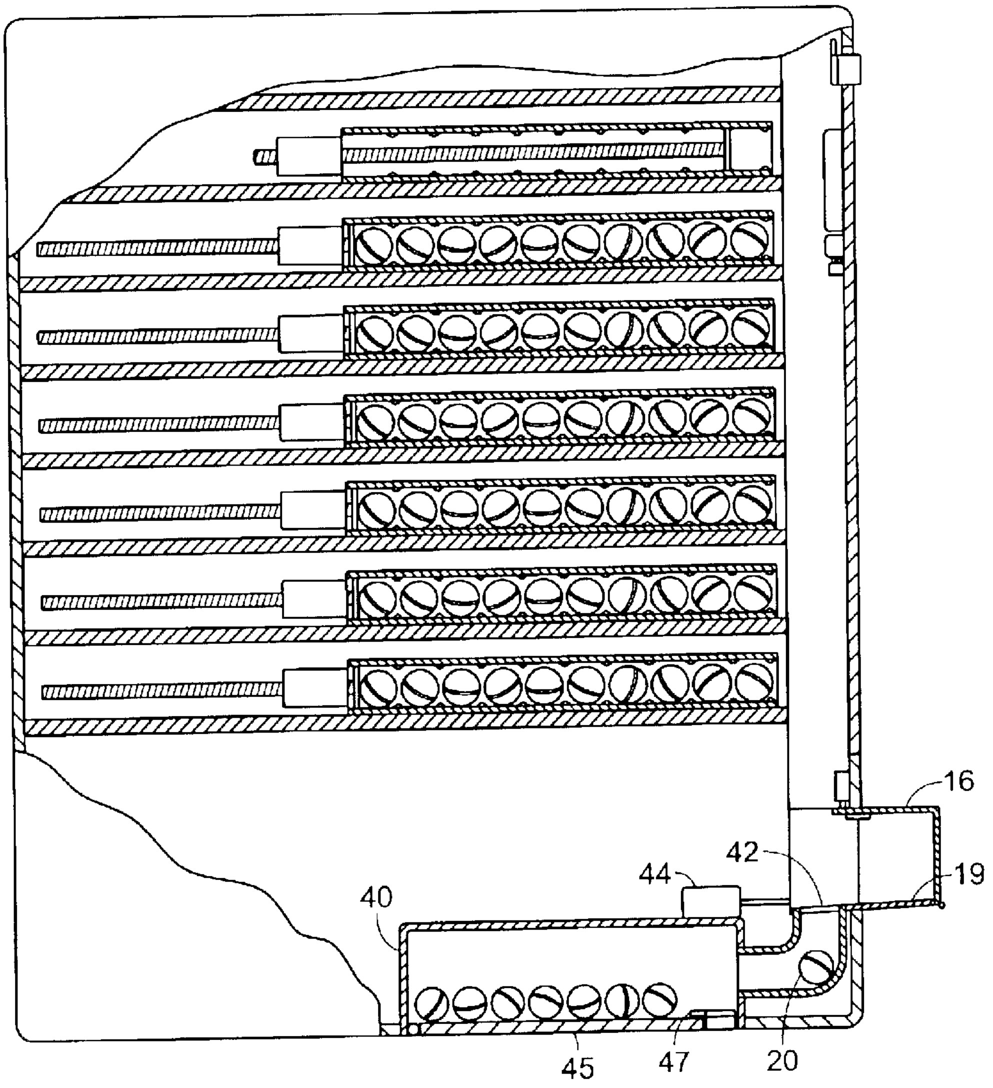
FIG. 5 is a side elevational view, illustrating how the carriers fall into the storage compartment if the patient fails to retrieve them within a predetermined time after being dispensed.
Figure 6:
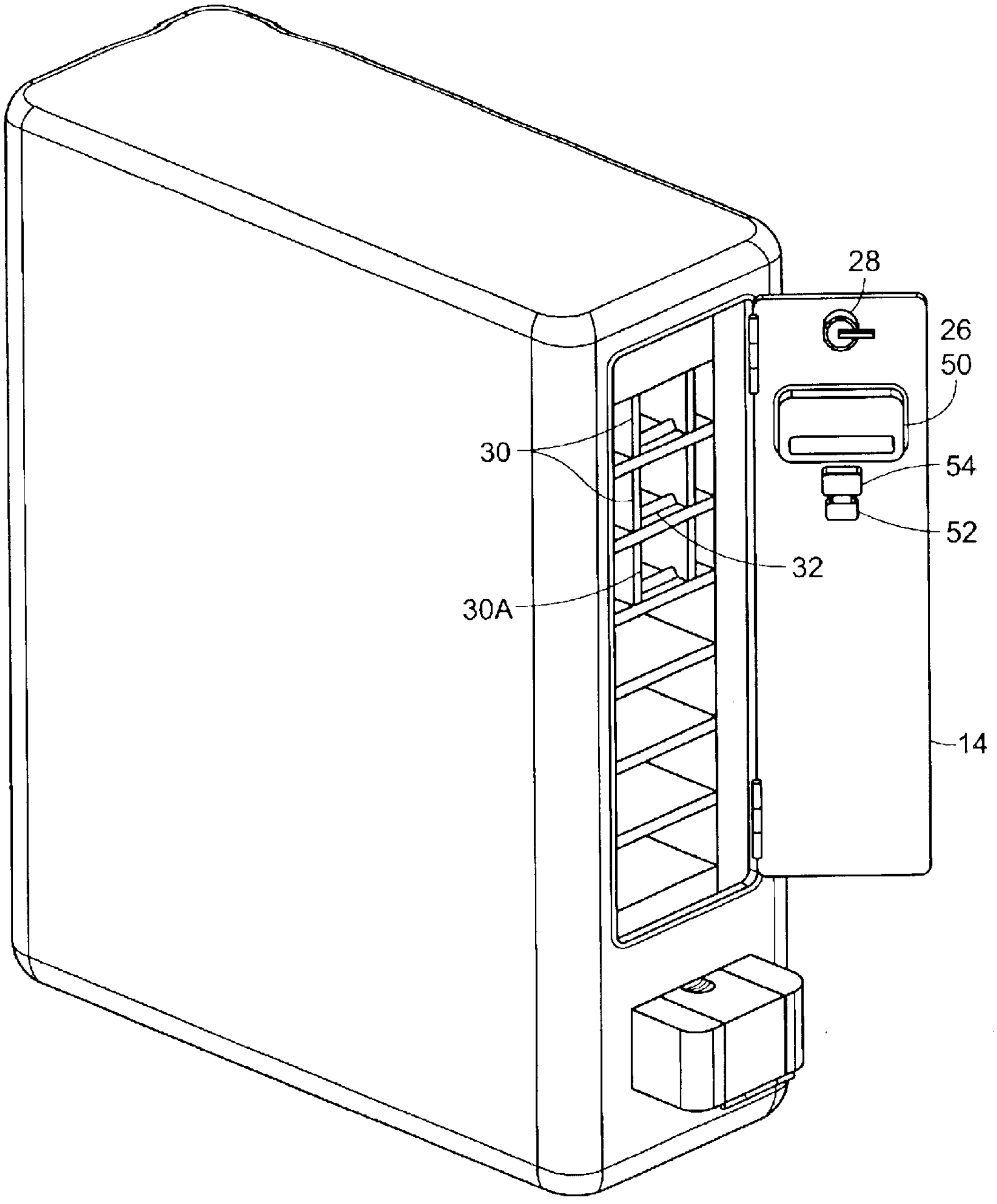
FIG. 6 is a diagrammatic perspective view, similar to FIG. 1, except wherein the front door has been opened for filling the dispenser with medicine carriers.

Referring to FIG. 5, when the patient fails to retrieve the medicine carrier 20 from the retrieval compartment 16 within a predetermined time, the medicine carrier 20 is placed into a storage compartment 40, to prevent the patient from taking medication within the medicine carrier 20 at an inappropriate time. Accordingly, a trap door 42 is provided at the retrieval compartment bottom 19, which is momentarily opened by an untaken medicine retrieval actuator 44 to cause the medicine carrier 20 to fall into the storage compartment 40. In this regard, the retrieval compartment bottom 19 should be rearwardly sloped, so that the medicine carrier 20 will fall into an unused medicine conduit 46 when the trap door 42 is opened. The compartment may have a storage compartment door 45, accessible at the bottom 12B of the housing. In furtherance of the goal of aiding patient compliance, access to the storage compartment 40 by the patient prevented by a storage compartment lock 47, which allows the pharmacist to remove the untaken medication. Because the untaken medication has been untouched by human hands, such medication can be re-used by the pharmacist where permissible under the law. FIG. 6 illustrate show the pharmacist access panel 14 may be unlocked by the pharmacist to provide access to the tubes 30, to fill said tubes with medicine carriers 20 as appropriate, and to program the system. Also illustrated, behind the clock 26 is a control unit 50 which orchestrates the functionality of the medicine dispensing system 10. Accordingly, a removable memory module 52 may be connected to the control unit 50 with a removable memory module socket 54. This provides one possible way for the pharmacist to program the system 10. The pharmacist may be provided with software tools which can allow the pharmacist to input the prescription constraints, and then generate a plan regarding the content of the medicine carriers, where they are to be located within the tubes 30, and then customizing the memory module 52 which can then instructs the control unit 50 regarding when the various medicine carriers are to be dispensed and what the rules are for reclaiming the medicine carriers if they are not retrieved by the patient.

Figure 7:
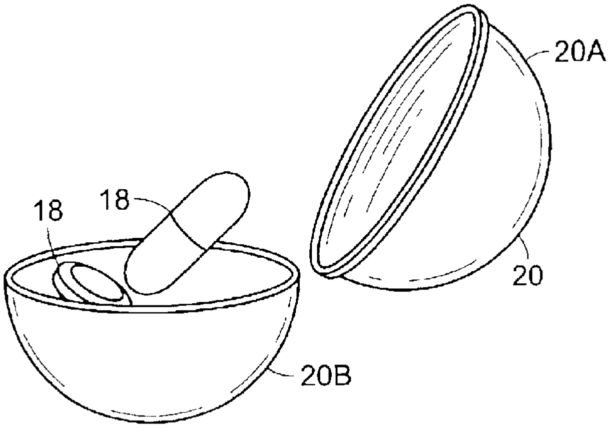
FIG. 7 is a diagrammatic perspective view illustrating one of the medicine carriers containing medicine therein.

FIG. 7 illustrates one of the medicine carriers 20. In its preferred form it is substantially spherical and hollow, having a bi-partite construction of a first carrier half 20A and a second carrier half 20B. The medicine 18 is easily loaded into the carrier 20 with the medicine to be taken at a particular time of day, on a particular day, and only medicine which is to be taken at that particular time and day.

Figure 8:
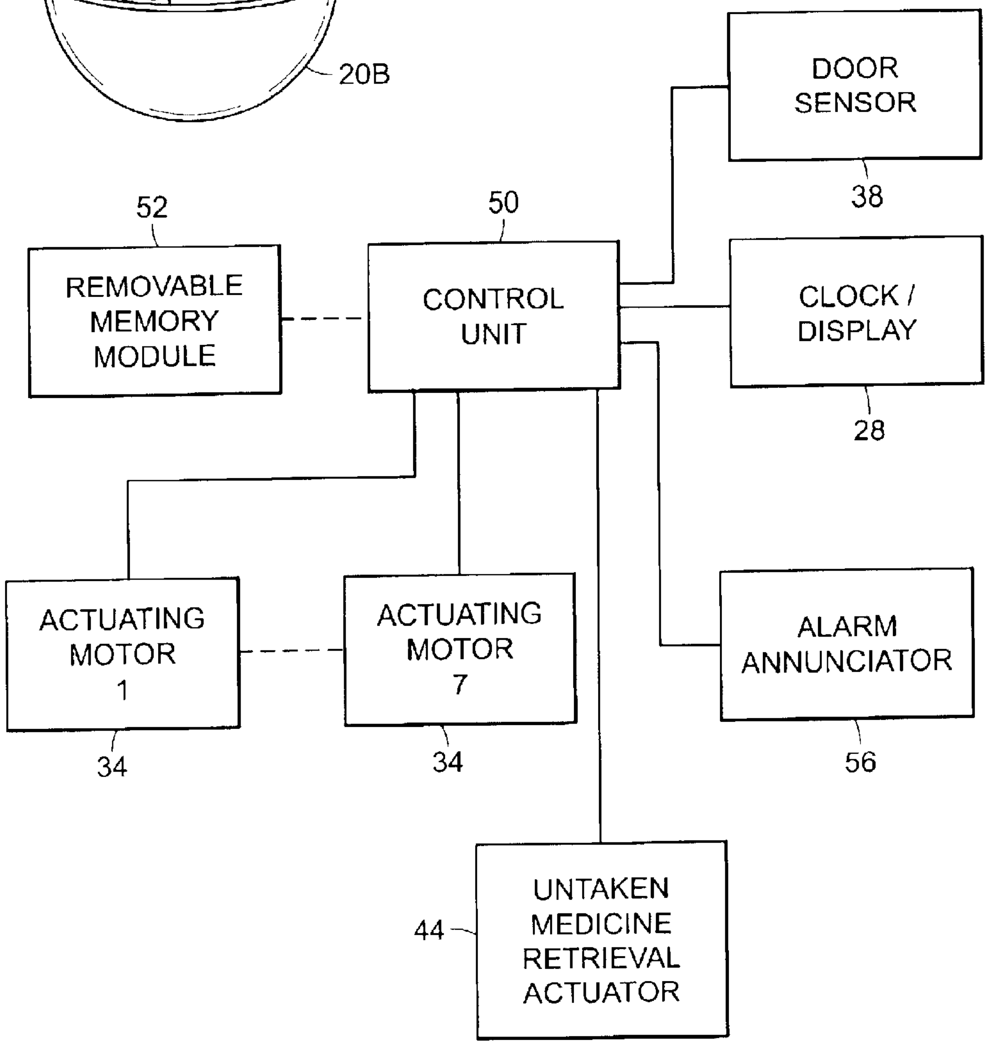
FIG. 8 is a block diagram, illustrating the interconnection of the major functional components of the dispensing system.

Referring to FIG. 8, description of the operation of the dispensing system follows—with reference to elements shown in the other drawing figures. In particular, the control unit 50 maintains the current time of day, and day of the week, and by reference to the removable memory module 52 determines when an appropriate medicine dispensing time has been reached. At the appropriate medicine dispensing time, the actuating motor 34 associated with the day of the week is activated. In particular, actuating motors 34 "1" through "1" can correspond to "Monday" through "Sunday", or any other desired convention. The actuating motor 34 moves the plunger 36 toward the open end 30A of the tube a sufficient distance to push one of the medicine carriers 20 in that tube out of the open end 30A, into the front chute 38 so that the medicine carrier 20 lands in the retrieval compartment 16. The control unit 50 provides an alert to the patient using the clock/display 28, and an alarm annunciator 56 to generate an audible alarm. When the patient retrieves the medicine carrier 20 by opening the retrieval compartment door 22, the door sensor 38 registers that the patient has retrieved the medicine carrier 20 and the alerts are cancelled. The fact of the medicine retrieval is recorded on the removable memory module 52. However, if the medicine carrier 20 is not retrieved because the door sensor 38 has not registered that the retrieval compartment door 22 has been opened following the dispensing, the untaken medicine retrieval actuator 44 causes the medicine carrier 20 to fall into the storage compartment 40.

In conclusion, herein is presented a system for dispensing medicine to a patient at the appropriate times, which takes significant steps toward aiding with patient compliance of the prescribed intake of medication. The system is illustrated by example in the foregoing description and in the appended drawing figures. Numerous variations are possible, while adhering to the inventive concept. Such variations are contemplated as being a part of the present invention.

What is claimed is:

1. A medicine dispensing system, for providing medications to a patient in medicine carriers, each medicine carrier having an associated appropriate times of the day at which it has been taken, as determined by a pharmacist, comprising:

a housing, the housing defining an interior space, and having a medicine retrieval compartment having a retrieval door which is openable by the user, the housing also having a pharmacist access door, the pharmacist access door having a lock such that the pharmacist access door is not operable by the patient;

a plurality of tubes, each of the tubes extending horizontally and having an open end, a back end, and a plurality of carrier positions evenly spaced between the open end and back end, the carrier positions are each bordered by a pair of division bumps which are capable of holding one of the medicine carriers therebetween, a chute extending in front of the open end of the tubes and connecting the open end of the tubes with the medicine retrieval compartment; and at least one actuator motor, the actuator motor having a shaft and a plunger located at one end of the shaft, the plunger capable of movement within at least one of the tubes for advancing all medicine carriers located in that tube toward the open end of said tube until one of the medicine carriers falls from the open end into the chute and into the medicine retrieval compartment; and a control unit, the control unit programmable by the pharmacist to determine the appropriate time of day when one of the medicine carriers is to be dispensed to the patient; for determining when that time of day has been reached; and for operating the at least one actuator motor to dispense that carrier when that time of day has been reached.

2. The medicine dispensing system as recited in claim 1, wherein each medicine carrier also has an associated appropriate day of the week during which it is to be taken, and wherein seven tubes are provided, each tube associated with one of the days of the week, and one actuator motor is provided and associated with each of the tubes.

3. The medicine dispensing system as recited in claim 2, further comprising a retrieval compartment door sensor, which determines and registers whether the patient has opened the retrieval door after one of the medicine carriers is dispensed.

4. The medicine dispensing system as recited in claim 3, wherein the system further comprises a storage compartment which is not accessible by the patient; wherein the retrieval compartment has a bottom having a trap door which leads to the storage compartment; and wherein the control unit is programmable such that following a predetermined time after one of the medicine carriers has been dispensed and the door sensor indicates that the medicine carrier has not been removed from the retrieval compartment, the trap door is opened to move the medicine carrier to the storage compartment to prevent the patient from ingesting medicine within the medicine carrier at time later than the appropriate time for taking that medicine.

5. The medicine dispensing system as recited in claim 4, the housing having a front, wherein the open end of the tubes is oriented toward the front of the housing, the tubes are stacked vertically, and wherein the pharmacist access panel is located at the front of the housing.

6. The medicine dispensing system as recited in claim 5, wherein the retrieval compartment has a pair of side members, and a compartment bottom, wherein the retrieval compartment retrieval door is hingeably attached to the retrieval compartment such that it opens forward and defines the front and top of the retrieval compartment when closed.

7. The medicine dispensing system as recited in claim 6, wherein the control unit is located at the pharmacist access panel, and allows a removable memory module to be connected to the control unit by the pharmacist, the removable memory module containing instructions regarding the appropriate times that each of the carriers is to be dispensed to the patient.

8. The medicine dispensing system as recited in claim 7, further comprising a storage compartment door having a storage compartment door lock, the storage compartment door allows the pharmacist to retrieve untaken medicine but does not allow the patient access to the untaken medicine.

* * * * *